Patented Sept. 25, 1928.

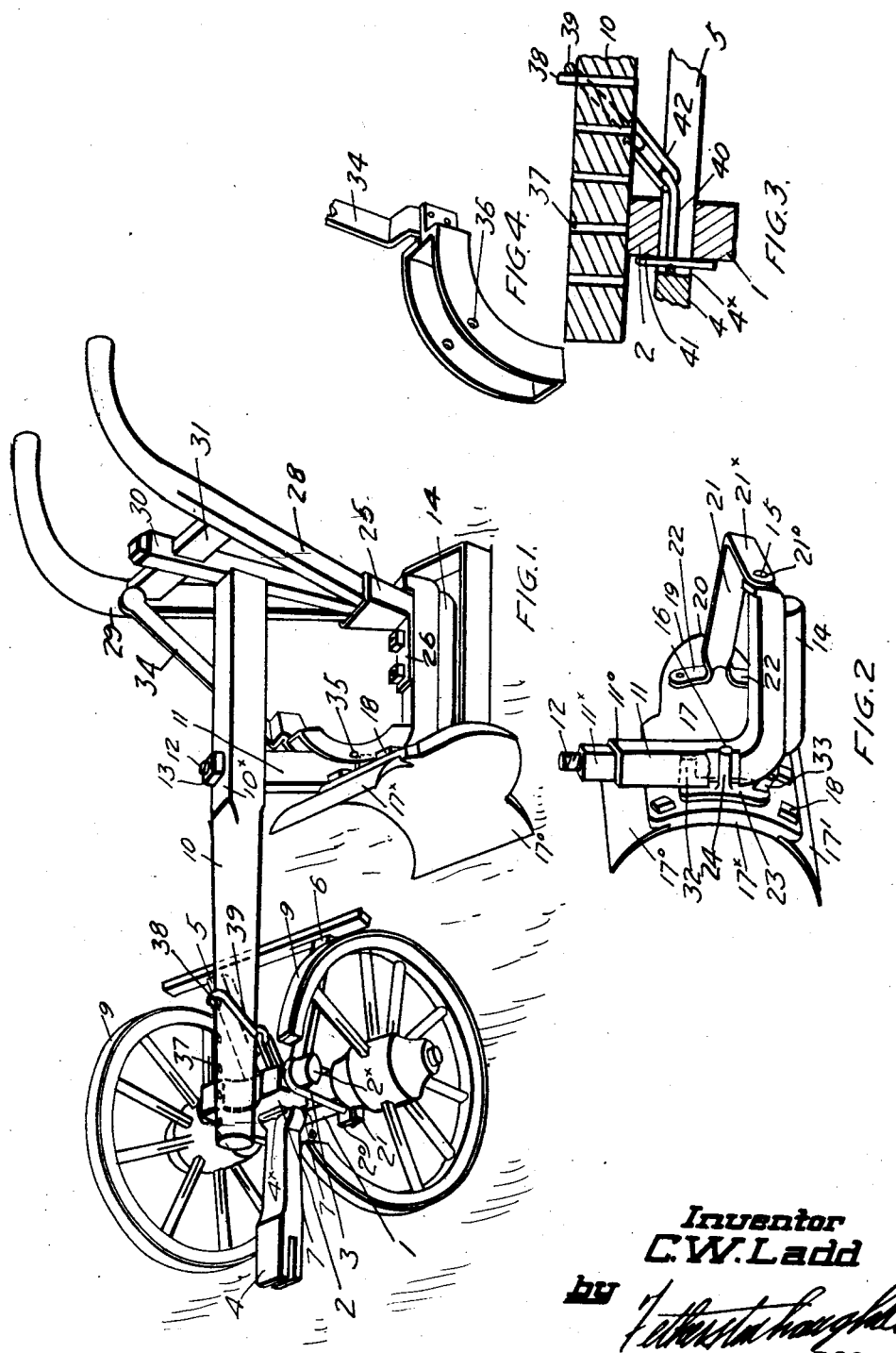

1,685,365

UNITED STATES PATENT OFFICE.

CHARLES WESLEY LADD, OF CHIPMAN, ALBERTA, CANADA, ASSIGNOR OF ONE-HALF TO TOM SING, OF EDMONTON, ALBERTA, CANADA.

HILLSIDE PLOW.

Application filed November 5, 1926. Serial No. 146,517.

My invention relates to improvements in hillside plows, and the object of the invention is to devise a plow of this type in which simple means is provided for regulating the depth of the furrow, in which the plow is steadied during its operation, and in which simple means are provided readily operated for securing the plow share in its two operative positions, and it consists essentially of the arrangement and construction of parts as hereinafter more particularly explained.

Fig. 1 is a perspective view of my hillside plow showing it in the operative position when plowing upon a side of a hill.

Fig. 2 is a perspective detail of the plow share and the bracket support for mounting it upon the plow beam.

Fig. 3 is a sectional detail showing the draft connection between the fore truck and the plow beam.

Fig. 4 is an enlarged perspective detail of the operative end of the locking lever.

In the drawing like characters of reference indicate corresponding parts in each figure.

1 indicates the axle of the fore truck to which the bolster 2 is secured by the U-bolts 3 extending over the arms $2^x$ of the bolster, the arms of the bolts extending at each side of the axle and through a tie plate $2^o$ secured therein by nuts $2^1$. 4 is a draft tongue provided with a Y-shaped inner end, the arms 5 and 6 of which extend between the axle 1 and bolster 2, being secured therebetween in the notches 7 and 8, the U-bolts 3 serving to clamp these parts in position.

It will be noted on referring to Figure 1 that the face of the fork forming the Y extends in front of the bolster so as to form an orifice $4^x$ for a purpose which will hereinafter appear.

9, 9 are the carrier wheels of the truck mounted on each axle 1. 10 is the plow beam. 11 is a right angular bracket the vertical arm of which is provided with a reduced portion $11^x$ extending through an orifice $10^x$ in the plow beam 10 and with a further reduced externally threaded stem 12 projecting above the plow beam 10 on the projecting end of which a nut 13 is screwed, the plow beam being gripped between the nut 13 and the shoulder $11^o$ formed at the base of the portion $11^x$. The horizontal portion of the bracket 11 is provided with a shoe 14 adapted to travel upon the ground and act as a runner. 15 is a stem extending from the rear end of the horizontal portion of the bracket 11. 16 is an orifice extending through the vertical portion of the bracket 11 from front to rear. 17 is a double edge plow share comprising a central portion $17^x$ and cutter portion $17^o$ and $17^1$ secured to the central portion by bolts 18. The lower portion of the central body $17^x$ is gradually reduced as indicated at 19 to a blunt point 20.

21 is a strap provided with a bifurcated portion 22 secured to the rear face of the plow share in proximity to the pointer portion 20. 23 is a plate secured to the portion $17^x$ in proximity to its opposite end or the end remote from the point 20. 24 is a stem extending from the plate 23 into the orifice 16 so as to pivotally support the share upon the bracket 11. The end of the strap 22 remote from its point of support upon the plow share is provided with right angular turned portion $21^x$ provided with an orifice $21^o$ into which the stem 15 extends so as to form a further pivotal support for the plow share. 25 is a socket substantially V-shaped in form and provided with a laterally extending plate portion 26 secured by bolts 27 to the upper face of the horizontal portion of the bracket 11.

A handle frame comprising handle members 28 and 29 and the central member 30 converged together so as to fit within the socket 25, a transverse member 31 connecting the parts 28 29 and 30 together.

The rear end of the plow beam 10 is suitably secured to the central member 30 intermediately of its height. The bracket 23 is provided at its opposite ends with outturned stop lugs 32 and 33 which alternately engage the opposite side of the vertical portion of the bracket 11 when the plow share is swung from the position shown in Figure 1 to the position shown in Figure 2.

In order to secure the plow share in either of these positions I have provided a locking lever 34, the operative end of which is of double arc-shaped form as clearly indicated in Figure 4 being pivoted intermediately of its length by a pin or bolt 35 extending through the orifice 36 and the vertical portion of the bracket 11. The handle of the lever 34 extends upward in a forward inclined direction convenient to the hand of the operator. As will be clearly seen from Figure 1 the arc-shaped portion of the lever 34 engages the lugs 33 so as to hold it securely engaged to the side of the vertical portion of the bracket 11 and thereby hold the plow share firmly in place.

When it is desired that the plow share assume the position shown in Figure 2 all it is necessary to do is to swing the handle of the lever 34 forward so as to carry the arc-shaped end thereof out of engagement with the lug 33. The rear end of the plow beam may then be lifted and the plow share swung to the position shown in Figure 2. When by again swinging the lever 34 forward the arc-shaped end thereof will engage with the lug 32 and thereby lock the plow share in its adjusted position.

In order to connect the forward end of the plow beam 10 to the bolster 2 I provide a series of orifices 37 extending through the plow beam and in any one of which a wedge key 38 is adapted to be driven.

39 is an U-shaped link extending over the plow beam so as to engage the wedge key 38 as clearly indicated in Figure 3. 40 is a substantially U-shaped link which extends at its base into the fork of the Y-shaped draft tongue. 41 is a key pin which extends through the orifice 4ˣ above referred to and through the base of the U-shaped link 40 so as to secure it in position. The arms of the link 40 are connected to the corresponding link 39 by interposed links 42.

By this means it will be seen that the draft connection between the fore truck and the plow beam may be adjusted forward or rearward as desired so as to vary the angular draft upon the plow to thereby regulate the depth to which the plow share will cut.

From this description it will be seen that I have devised a very simple construction of hillside plow by which the plow will be steadied during its operation by reason of the forward end of the plow beam being carried upon a fore truck, in which the depth the plow share cuts will be easily regulated by adjusting the draft connection between the fore carriage and plow beam either forward or rearward so as to vary the angular position of the plow beam in relation to the ground, and in which I have devised simple means whereby the plow share may be releasably locked in its adjusted position whenever desired.

What I claim as my invention is:

1. In a hillside plow, the combination with the plow beam, of a right angular bracket, the vertical arm of which extends from the plow beam and the horizontal arm of which extends parallel with the ground, a shoe secured at such horizontal portion and bearing upon the ground, a double edge plow share pivoted at one end centrally of the vertical portion of the bracket so as to swing from side to side thereof, and a strap secured to the opposite end of the plow share and having an angular extension pivotally connected at its end to the forward end of the horizontal portion of the bracket.

2. A hillside plow comprising a plow beam, an L-shaped standard having its vertical arm terminally secured to the plow beam and its horizontal arm extending rearwardly, a reversible plow share provided with a rearwardly projecting stem rotatably mounted in the vertical arm of the standard, stops carried by the plow share and cooperating with opposite sides of the vertical arm of the standard to limit swinging movement of the plow share about its pivot, and a locking member pivoted to the vertical arm of the standard and presenting side portions adapted to overlie one of the stops of the plow share when said stop is engaged with a side of said arm so as to secure the plow share against pivotal movement relative to said arm.

CHARLES WESLEY LADD.